United States Patent [19]

Huber et al.

[11] Patent Number: 5,549,861
[45] Date of Patent: Aug. 27, 1996

[54] PROCESS FOR THE PRODUCTION OF SHAPED STRUCTURES OF CELLULOSE

[75] Inventors: Bernd Huber; Richard Kinseher, both of Kelheim, Germany

[73] Assignee: Hoechst Aktiengesellschaft, Frankfurt, Germany

[21] Appl. No.: 387,332

[22] Filed: Feb. 13, 1995

[30] Foreign Application Priority Data

Feb. 15, 1994 [DE] Germany .......................... 44 04 714.2

[51] Int. Cl.⁶ .............................. B29C 47/00; D01F 2/24; D01F 2/28; D01F 2/30
[52] U.S. Cl. .......................... 264/187; 264/200; 264/207; 264/211.13; 264/211.14
[58] Field of Search ..................................... 264/187, 200, 264/207, 211.13, 211.14

[56] References Cited

U.S. PATENT DOCUMENTS 2,129,052  2/1936  Fordyce .
3,482,011  12/1969  Bohler .
4,983,730  1/1991  Domeshek .

FOREIGN PATENT DOCUMENTS 605306      7/1948   United Kingdom .
WO91/16357  10/1991  WIPO .

OTHER PUBLICATIONS

European Search Report 95101603.9 May 31, 1995.
Cellulose Derivatives, C. J. Malm, Industrial & Engineering Chemistry (1957).
6019 Macromolecules, 24 (1991) May 26, No. 11, Prep. and Characterization of Cellulose . . . Charles M. Buchanan.

*Primary Examiner*—Leo B. Tentoni
*Attorney, Agent, or Firm*—Connolly and Hutz

[57] ABSTRACT

A process for the production of shaped structures of cellulose, in particular fibers of cellulose, by shaping and subsequent regeneration of water-soluble cellulose derivatives is described. The process employs water-soluble alcohols, water-soluble ketones or, in particular, water or mixtures thereof as solvents for the shaping and carrying out the shaping by a dry shaping process.

13 Claims, No Drawings

PROCESS FOR THE PRODUCTION OF SHAPED STRUCTURES OF CELLULOSE

BACKGROUND OF THE INVENTION

1. Field of the Invention

The invention relates to a process for the production of shaped structures of cellulose with the aid of cellulose derivatives.

2. Description of the Related Art

The use of cellulose derivatives for the production of cellulosic fibers is known. Cellulose xanthogenates are usually employed, and are spun in alkaline solution and regenerated to cellulose with strong acids. This process is described, for example, in: Dr. K. Götze, "Chamie-fasern nach dem Viskoseverfahren (Synthetic Fibers by the Viscose Process)", Springer Verlag 1967.

The disadvantages of this process are the formation of large amounts of by-products, such as sodium sulfate and hydrogen sulfide.

It has also been proposed to replace the sulfur derivatives by nitrogen derivatives. A carbamate process is described, for example, by O. T. Turunen, J. Fors and J. I. Huttunen in Lenzinger Ber. 59 (1985), page 111. The disadvantage of this process also is the large amount of sodium sulfate obtained.

Processes furthermore are known for the production of cellulosic fibers in which cellulose acetate fibers (2,5- or 3-acetates) spun from organic solvents are then hydrolyzed. Examples of these are to be found in U.S. Pat. No. 4,464,323.

The disadvantage of this process is the large amount of sodium acetate obtained.

The preparation, properties and uses of highly hydrolyzed cellulose acetates are described in Industrial and Engineering Chemistry, 49(1), pages 79–83 (1957). Regeneration of such derivatives to cellulose is not disclosed.

A dry spinning process for cellulose fibers is known from U.S. Pat. No. 3,482,011. Spinning is carried out from mixtures comprising water-miscible solvents. Spinning from water leads to problems. Regeneration of the resulting fibers to cellulose is not disclosed.

U.S. Pat. No. 4,983,730 describes cellulose acetate mixtures of components of various molecular weights and the production of fibers from such mixtures. A dry spinning process is not disclosed.

A novel process for the production of cellulosic fibers is based on the direct solution of cellulose in N-methylmorpholine N-oxide and a subsequent wet spinning process. Such a process is described, for example, in EP-A-0 490 870. The disadvantage of this process is that solvent residues remain in the fiber and can cause trouble, for example, during use in medical or hygiene sectors.

There is thus still a need for a process for the production of shaped structures of cellulose in which low amounts of by-products are formed, in particular for a process which operates without the formation of large amounts of by-product and in which, in particular, no organic solvent is employed.

SUMMARY OF THE INVENTION

We have found that water-soluble cellulose derivatives, in particular water-soluble cellulose esters of organic aliphatic or inorganic acids are suitable for the production of shaped structures of cellulose from selected solutions by the dry shaping process.

In the process according to the invention, cellulose derivatives are dissolved in water, water-soluble alcohols or water-soluble ketones or mixtures thereof with water to give a viscous shaping solution, and the solution is filtered and processed by a dry shaping process to give shaped structures of cellulose derivatives.

These cellulose derivatives can easily be regenerated to cellulose (hydrolyzed) chemically and/or by means of heat, if appropriate using catalysts.

Water-soluble cellulose derivatives are known. These include, for example, cellulose esters, cellulose acetals or half-acetals or else cellulose ethers. Water-soluble cellulose acetates are described, for example, in Ullmann, "Enzyklopädie der technischen Chemie (Encyclopedia of Industrial Chemistry)", Volume 9 (1975), pages 233–238.

In the process according to the invention, cellulose derivatives are dissolved in water, water-soluble alcohols or water-soluble ketones or mixtures thereof with water to give a viscous shaping solution, and the solution is filtered and processed by a dry shaping process to give shaped structures of cellulose derivatives.

Suitable alcohols are, in particular, aliphatic alcohols having one to four carbon atoms, such as methanol, ethanol, propanol or butanol. Suitable ketones are, in particular, ketones having two aliphatic radicals, which in turn have one to four carbon atoms, such as acetone. Water is especially preferably employed as the solvent. Mixtures of these solvents can also be employed.

In the dry shaping process, the shaping solution is pressed through a die, with shaping, into a hot stream of gas, the solvent evaporates in the hot gas and the shaped structure formed is drawn off from the die at a high speed. The shaped structure is then wound up, deposited in cans or further treated directly.

In the context of this description, the term "shaped structure" is to be understood in its broadest meaning. It preferably means films or, in particular, fibers.

Decomposition of the cellulose derivative may already start slowly during shaping. This process can be accelerated by suitable catalysts.

The cellulose derivative structure thus shaped can be regenerated by heat treatment and/or by chemical hydrolysis.

Water-soluble cellulose derivatives which can be employed are, for example, cellulose esters of organic carboxylic acids, such as cellulose formates, acetates, propionates or butyrates, but also cellulose esters of inorganic acids, such as sulfuric acid esters or nitric acid esters.

The degree of substitution, which leads to water-solubility, is determined by the acid employed. In the case of cellulose acetates or cellulose formates, it is usually 0.4–1.2, preferably 0.4–0.8 acetyl groups per cellulose unit. A distribution of the ester groups which is as random as possible over the entire polymeric cellulose molecule is important here.

Solvents which are used are water-soluble alcohols or ketones described above or, in particular, water.

High temperatures, preferably 80°–100° C., are of advantage here if the stability of the derivatives allows.

The dissolving can be carried out discontinuously in a stirred tank or continuously in dissolving units, such as are employed, for example, for viscose cellulose acetate or polyacrylonitrile fibers. The suitable concentrations depend on the chain length of the cellulose esters, and viscosities of 100–500 falling-ball seconds, measured at 80° C., are advantageous for conventional dry spinning with die pressures of up to 25 bar. Suitable concentrations here are 20–30 percent by weight.

It is also appropriate to spin higher concentrations and higher viscosities, especially if solutions having anisotropic properties are thereby obtained. However, dies of relatively high compressive strength—such as, for example, melt spinning dies, must be employed here.

Water-soluble cellulose derivatives, the viscosity of which in 6% strength by weight solution at 25 degrees Celsius is 100–1000 cps are especially preferably employed.

If the hydrolysis of cellulose derivatives is to be carried out by means of heat, catalysts can advantageously be added to the shaping operation. Depending on the catalytic action, these catalysts can already be added during dissolving or up until just before shaping.

Suitable catalysts are both acids and bases, as well as acid or basic metal salts. After dissolving, the shaping solution is filtered and is stored under hot conditions. If catalysts are employed, the hydrolysis can be controlled via the storage time and the storage temperature and the optimum degree of esterification for further processing can thus be established.

Before the shaping, the shaping composition is heated to 110°–150° C., preferably 120°–135° C., and forced through the shaping die into the hot gas.

Dies which have proved themselves for dry spinning of acrylic fibers, for example, can be used during shaping. Both compact and granular dies are suitable. The hole diameters are usually 100–400 μm, preferably 150–250 μm.

The hot gas is passed in the filament direction for example in a shaft heated with a Jacket and moved in or against the running direction of the filament. Customary gas temperatures at the entry to the shaft are between 250° and 400° C.

The shaft wall temperature depends on the throughput of the shaping composition and the shaft length. The gas and shaft wall temperature are controlled such that the shaped structure is dry on leaving the shaft, i.e. such that the shaped structure or structures do not stick to one another. The shaped structures are taken off at the end of the shaft. Customary take-off speeds are between 100 and 800 m/minute. The speed is primarily determined by the nature of the after-treatment. Higher speeds are usually chosen for winding up, and for direct on-line processing or intermediate storage in cans, speeds of 100–500 m/minute are advantageous. Subsequent hydrolysis of the cellulose derivatives can be carried out by means of heat and/or chemically. In this operation, the fiber material is expediently passed in cable form over a belt conveyor. However, filaments can also be treated on the bobbin.

The thermal hydrolysis is carried out at elevated temperatures of, for example, 100°–200° C. in the presence of moisture. The residence times required are determined by the catalysts employed. They are usually between 5 minutes and 1 hour, but shorter or longer treatment times are also possible here.

Suitable units are heated rolls, over which the fiber cable can be passed under tension or with slight stretching, or belt or perforated cylinder driers which operate without tension.

The chemical after-treatment is expediently carried out in an alkaline medium, preferably in alkaline aqueous solutions. If sticking occurs, higher salt concentrations may be advantageous here. However, it is also possible to employ anhydrous or water-containing organic solvents, such as, for example, alcohols.

Suitable bases are, for example, metal hydroxides, such as sodium hydroxide, potassium hydroxide or calcium hydroxide.

Other alkaline compounds, such as, for example, carbonates, in particular sodium or potassium carbonates, can also be used.

The chemical hydrolysis is preferably carried out in hot baths at 40°–100° C. under tension—if appropriate with slight stretching or without tension.

The hydrolyzed shaped structures, such as the fiber cable or the bobbins, are then washed and dried.

Drying under tension or also prior specialized steaming with slight stretching increases the strength of the shaped structures.

The subsequent further treatment is carried out by the process steps known for shaped structures. In the case of filaments or fibers, that is to say, for example, application of a twist to filament yarns or crimping and cutting fiber cable for staple fiber production.

The resulting regenerated cellulose fibers are distinguished by a dumbbell-shaped cross-section.

EXAMPLE 1

600 g of a cellulose acetate having a content of acetyl groups of 5 mmol/g were dissolved in 1.9 l of hot water at 95° C. The filtered and degassad solution had a viscosity of 200 falling-ball seconds at 80° C. (the determination of the falling-ball viscosity is described in K. Götze, Chemiefasern nach dam Viskoseverfahren (Synthetic Fibers by the Viscose Process), 3rd edition, 2nd volume, page 1181). The spinning solution, heated to 125° C., was forced via a spinning pump through a die having 50 holes, hole diameter 0.15 mm, into a shaft. The gas flowing in had a temperature of 380° C. and the temperature of the shaft wall was 280° C.

The filaments were taken off at the shaft end at 150 m/min and wound up.

Dumbbell-shaped fibers with small thickenings at both ends were obtained.

The fibers were still water-soluble and had the following properties:

| | |
|---|---|
| Titer: | 10 dtex |
| Maximum tensile strength: | 13 cN/tex |
| Elongation at break: | 25% |

EXAMPLE 2

A spinning solution from Example 1 was spun through a die having 20 holes, hole diameter 0.15 mm, under the conditions as in Example 1, but the take-off at the shaft end was increased to 305 m/min and the spinning pump output was reduced in order to obtain the same individual fiber titer.

The fibers were water-soluble and had the following properties:

| | |
|---|---|
| Titer: | 10 dtex |
| Maximum tensile strength: | 15 cN/tex |
| Elongation at break: | 19% |

EXAMPLE 3

The fibers from Examples 1 and 2 were hydrolyzed in 10% strength methanolic KOH, neutralized with water containing acetic acid and washed. After drying without tension, white fibers having dumbbell-shaped cross sections were obtained. The fibers consisted of unsubstituted cellulose.

The following fiber properties were measured:

| Titer: | 8 dtex |
|---|---|
| Tear strength: | 12 cN/tex |
| Elongation at break: | 20% |

We claim:

1. A process for the production of a shaped structure of cellulose from a shaping solution comprising the steps of:

providing a shaping solution comprising a solvent, which is water-soluble alcohol, water-soluble ketone, water, or mixtures thereof, and a water-soluble cellulose derivative;

shaping said shaping solution into a shaped structure by a drying shaping process and regenerating the shaped structure to give cellulose.

2. The process as claimed in claim 1, wherein the shaped structure is a fiber.

3. The process as claimed in claim 1, wherein a cellulose ester is employed as the water-soluble cellulose derivative.

4. The process as claimed in claim 3, wherein cellulose acetate having a degree of acetylation of 0.4 to 1.2 is employed as the cellulose ester.

5. The process as claimed in claim 3, wherein cellulose formate having a degree of formylation of 0.4 to 1.2 is employed as the cellulose ester.

6. The process as claimed in claim 1, wherein the viscosity of the water-soluble cellulose derivative in 6% by weight solution at 25 degrees Celsius is 100–1000 cps.

7. The process as claimed in claim 1, wherein the regeneration of the shaped water-soluble cellulose derivatives is carried out by means of heat at a temperature of 100°–200° C. in the presence of moisture.

8. The process as claimed in claim 7, wherein the regeneration is carried out in the presence of a catalyst.

9. The process as claimed in claim 1, wherein the regeneration of the shaped water-soluble cellulose derivative is carried out by after-treatment in an alkaline medium.

10. A process as claimed in claim 1, wherein the solvent is water.

11. A process as claimed in claim 3, wherein cellulose acetate having a degree of acetylation of 0.4 to 08. is employed in the cellulose easter.

12. A process as claimed in claim 3, wherein cellulose formate having a degree of formylation of 0.4 to 08. is employed in the cellulose easter.

13. The process as claimed in claim 8, wherein the catalyst is added to the shaping solution.

* * * * *